US008982241B2

(12) United States Patent
Choi

(10) Patent No.: US 8,982,241 B2
(45) Date of Patent: Mar. 17, 2015

(54) IMAGE PHOTOGRAPHY APPARATUS AND METHOD OF RECOVERING EDITING IMAGE THEREOF

(75) Inventor: Song-ha Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 13/218,071

(22) Filed: Aug. 25, 2011

(65) Prior Publication Data

US 2012/0050574 A1 Mar. 1, 2012

(30) Foreign Application Priority Data

Aug. 26, 2010 (KR) ........................ 10-2010-0082961

(51) Int. Cl.
*H04N 5/76* (2006.01)
*G11B 27/36* (2006.01)
*G11B 27/034* (2006.01)
*G11B 27/30* (2006.01)
*G11B 27/32* (2006.01)

(52) U.S. Cl.
CPC .............. *G11B 27/36* (2013.01); *G11B 27/034* (2013.01); *G11B 27/3027* (2013.01); *G11B 27/329* (2013.01)
USPC ................ 348/231.99; 348/231.2; 348/231.3; 348/231.6; 348/231.9

(58) Field of Classification Search
None
See application file for complete search history.

(56) References Cited

U.S. PATENT DOCUMENTS

| 7,991,747 | B1 * | 8/2011 | Upadhyay et al. ............ 707/674 |
| 2007/0299888 | A1 * | 12/2007 | Thornton et al. ............. 707/203 |
| 2008/0155216 | A1 * | 6/2008 | Shoham ........................ 711/162 |
| 2008/0309782 | A1 * | 12/2008 | Nakamura et al. .......... 348/222.1 |
| 2009/0198747 | A1 * | 8/2009 | Kim et al. ..................... 707/202 |
| 2010/0274978 | A1 * | 10/2010 | Koike et al. .................. 711/154 |
| 2012/0002078 | A1 * | 1/2012 | Nakamura et al. .......... 348/231.2 |
| 2012/0230609 | A1 * | 9/2012 | Fuchs et al. .................. 382/305 |

* cited by examiner

*Primary Examiner* — Lin Ye
*Assistant Examiner* — John H Morehead, III
(74) *Attorney, Agent, or Firm* — Staas & Halsey LLP

(57) ABSTRACT

An image photography apparatus includes a storage unit to store data which is generated when an image is edited in the image photography apparatus, a receiver to receive an event to recover the image if editing of the image that is being edited in the image photography apparatus stops, and a controller to determine whether the image is to be recovered to an unedited original image or editing of the image is to be resumed to recover the image to a completely edited image according to an edited degree of the image so as to recover the image to the unedited original image or the completely edited image.

34 Claims, 15 Drawing Sheets

IMAGE PHOTOGRAPHY APPARATUS AND METHOD OF RECOVERING EDITING IMAGE THEREOF

CROSS-REFERENCE TO RELATED APPLICATIONS

This application claims the benefit of priority under 35 U.S.C. §119 from Korean Patent Application No. 10-2010-0082961, filed on Aug. 26, 2010, in the Korean Intellectual Property Office, the disclosure of which is incorporated herein by reference in its entirety.

BACKGROUND

1. Field of the Invention

The present general inventive concept generally relates to an image photography apparatus and a method of recovering an editing image thereof, and more particularly, to an image photography apparatus which, if an editing work is compulsorily or suddenly ended, can efficiently recover the editing image according to an edited degree of the image and a method of recovering an editing image thereof.

2. Description of the Related Art

Due to the development of electronic technology fields such as image processing technology, communication technology, semiconductor technology, etc., an image is captured, stored, and easily transmitted to an external device using an image photography apparatus such as a camcorder.

Due to user demand for high-resolution images, an image photography apparatus requires a large storage space to capture and store high-resolution images. However, a memory space that the image photography apparatus can use may be limited.

This lack of a storage space may be a problem when an image is edited using an image photography apparatus.

Due to a limited storage space of an image photography apparatus, when a captured original image is edited, the original image is not stored separately from the edited version during the editing process.

Accordingly, if an image photography apparatus is compulsorily ended by a removal of a memory or power when the image photography apparatus is editing an image, the image is damaged, and an editing work that has been performed is useless.

SUMMARY

The present general inventive concept provides an image photography apparatus which, if an editing work is compulsorily ended, determines whether to recover an image that has stopped editing to an unedited original image or to a completely edited image, in consideration of an edited degree of the image and a method of recovering an editing image thereof.

Additional embodiments of the present general inventive concept will be set forth in part in the description which follows and, in part, will be obvious from the description, or may be learned by practice of the general inventive concept.

The foregoing and/or other features and utilities of the present general inventive concept may be achieved by a method of recovering an editing image of an image photography apparatus, the method including, when editing of an image which is being edited in the image photography apparatus stops, receiving an event to recover the image, determining whether the image is to be recovered to an unedited original image or editing of the image is to be resumed to recover the image to a completely edited image according to an edited degree of the image, and recovering the image to the unedited original image or the completely edited image according to the determination.

The determination may include a first determination to determine whether recovery reference data is generated during editing of the image, and, if it is determined that the recovery reference data is generated during editing of the image, a second determination to determine whether temporary data is generated during editing of the image.

The determination may further include, if it is determined that the recovery reference data is not generated during editing of the image, determining to recover the image to the unedited original image.

The determination may further include if it is determined that the temporary data is generated during editing of the image, determining to recover the image to the completely edited image using the stored temporary data.

The method may further include receiving an image editing command to edit the image, and editing the image according to the image editing command.

The edition of the image may include storing data which is generated during editing of the image.

The determination may be to automatically determine whether the image is to be recovered to the unedited original image or the completely edited image according to the edited degree of the image if the event is received.

The event may be a user command to request a recovery of the image.

The foregoing and/or other features and utilities of the present general inventive concept may also be achieved by an image photography apparatus including a storage unit to store data which is generated when an image is edited in the image photography apparatus, a receiver to receive an event to recover the image if editing of the image that is being edited in the image photography apparatus stops, and a controller to determine whether the image is to be recovered to an unedited original image or editing of the image is to be resumed to recover the image to a completely edited image according to an edited degree of the image so as to recover the image to the unedited original image or the completely edited image.

The controller may determine whether data generated during editing of the image includes recovery reference data.

If it is determined that the data includes the recovery reference data, the controller may determine whether temporary data is stored during editing of the image.

If it is determined that the data does not include the recovery reference data, the controller may recover the image to the unedited original image.

If it is determined that the temporary data is stored during editing of the image, the controller may recover the image to the completely edited image using the temporary data.

The receiver may receive an image editing command to edit the image, and the controller may edit the image according to the image editing command.

If the event is received, the controller may automatically determine whether the image is to be recovered to the unedited original image or the completely edited image according to the edited degree of the image.

The event may be a user command to request a recovery of the image.

The image photography apparatus may be a camcorder.

Features and/or utilities of the present general inventive concept may also be realized by a method of recovering an image, the method including receiving a command with respect to an image file, determining whether an editing version of the image file exists, and determining whether to respond to the command using an original version of the image file or the editing version of the image file according to a level of editing of the edited version of the image.

The method may further include, before receiving the request to output the image, storing the editing version of the image file as a result of an edit-process-ending event.

The edit-process-ending event may be one of a loss-of-power, a program crash, and a disconnection of a memory device in which the editing version of the image file is stored.

Receiving the command may correspond to a selection by a user.

Receiving the command may correspond to turning on a display device after one of a program crash and a loss-of-power of the display device or re-connecting memory having stored therein the editing version of the image file to the display device.

Determining whether the editing version of the image file exists may include determining whether at least one of recovery reference data and temporary data exists, the recovery reference data is data generated at a beginning of an editing operation of the image, and the temporary data may be data generated based on the recovery reference data to perform the editing of the image file.

Determining which of the original version and the editing version of the image file to use to respond to the command may include, when it is determined that both recovery reference data and temporary data exist, performing an editing operation using the temporary data, and when it is determined that only the recovery reference data exists from among the recovery reference data and the temporary data, performing the editing operation of the image by generating temporary data based on the recovery reference data.

Determining which of the image and the edited version of the image to output may include determining whether at least one of the recovery reference data and the temporary data exists, and outputting the original version of the image file if neither of the recovery reference data and temporary data exists.

Features and/or utilities of the present general inventive concept may also be realized by an image-editing device, including a storage unit to store at least one of an original version of an image file and an editing version of the image file to be used to edit the original version of the image file, and a controller to receive a command with respect to the original version of the image file, to determine whether the editing version of the image file exists, and to determine which of the original version and the editing version of the image file to use to respond to the command according to a level of editing of the editing image file.

The image-editing device may further include a user interface to receive the command from a user.

The controller may store the editing version of the image file in the storage unit when an edit-process-ending event occurs, the edit-process-ending event including at least one of a loss-of-power to the image-editing device and a program crash of a program executed by the controller.

The controller may determine whether the editing version of the image file exists by determining whether at least one of recovery reference data and temporary data exists in the storage unit, where the recovery reference data is data generated at a beginning of an editing operation of the image, and the temporary data is data generated based on the recovery reference data to perform the editing of the image.

When the controller determines that both recovery reference data and temporary data exist in the storage unit, the controller may perform an editing operation using the temporary data, and when the controller determines that only the recovery reference data exists from among the recovery reference data and the temporary data, the controller may perform the editing operation of the image by generating temporary data based on the recovery reference data.

The controller may determine which of the original version of the image file and the editing version of the image file to use to respond to the command by determining whether at least one of the recovery reference data and the temporary data exists in the storage unit, and the controller may respond to the command using the original version of the image file if neither of the recovery reference data and temporary data exists in the storage unit.

The image-editing device may include an image processor to edit the image, and the controller may receive a command to edit the image and may control the image processor to retrieve the image and to generate the editing version of the image file.

Features and/or utilities of the present general inventive concept may also include a method of recovering an image, the method including receiving a command with respect to an original version of an image file, determining whether an editing version of the image file exists, and responding to the command with the editing version of the image file when the editing version of the image file exists.

The method may further include, after receiving the command, automatically completing an editing operation of the editing version of the image file when it is determined that the editing operation of the image has not yet been completed, and responding to the command using the completely edited version of the image file.

The method may further include saving the completely edited version of the image file to have a same name as the original version of the image file.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
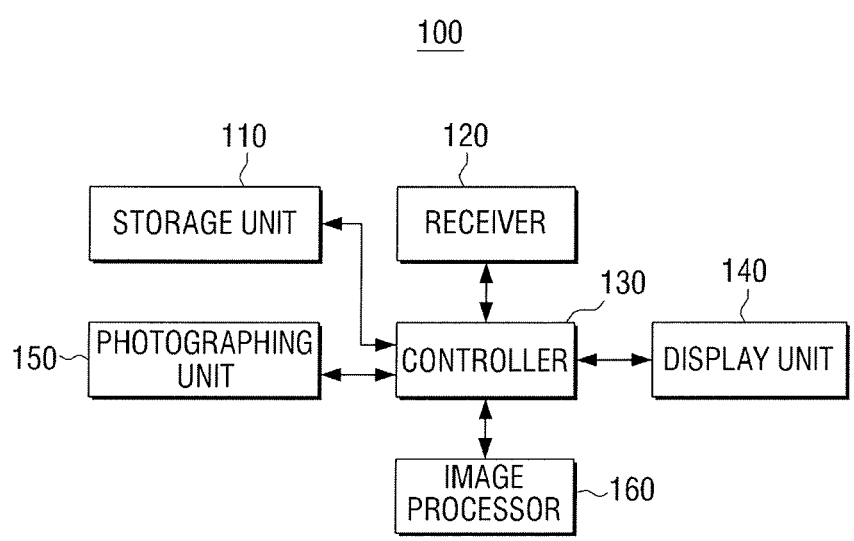
FIG. 1 is a block diagram illustrating an image photography apparatus according to an exemplary embodiment.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an image photography apparatus 100 according to an exemplary embodiment.

Referring to FIG. 1, the image photography apparatus 100 includes a storage unit 110, a receiver 120, a controller 130, a display unit 140, a photographing unit 150, and an image processor 160.

The storage unit 110 stores various types of data of the image photography apparatus 100. The various types of data may include a captured image, an edited image, data set by a user, recovery reference data, temporary data, a file name, an extension, recorded voices, information necessary for synchronizing voices and an image, and the like.

The storage unit 110 stores data which is changed during an editing work of the image photography apparatus 100. The storage unit 110 also stores various applications such as a moving picture or video editing program, a still photo editing program, audio editing programs, or the like.

The storage unit 110 may include an external memory or an internal memory, and the kinds of memories included in the storage unit 110 are not limited. For example, the storage unit 110 may include volatile and non-volatile memory, such as FLASH memory, DRAM, EEPROM, and optical or magnetic storage disks.

The editing work of an image file may include various processing works or operations to change contents of an image. Editing work may include, for example, image division, an image combination, partial deletion of an image, cut-and-pasting of portions of an image, moving of image portions, and the like.

The receiver 120 receives an image editing command to edit an image from a user. If editing of an image that is being performed by the image photography apparatus 100 stops, the receiver 120 receives an event to recover the image that is being edited. According to the reception of the event, the receiver 120 receives a user command to select whether the image is to be recovered to an original image or a completely edited image, based on an edited degree of the image. For example, the receiver 120 may include a user interface such as keys or a touch-screen display, or may be a computer program or hardware connected to the user interface to receive input from the user interface.

The event may be a user command to request a recovery of an image. The event may also include an event in which a memory that has been removed from the image photography apparatus 10 is re-attached to the image photography apparatus 100 or a power source is re-applied to the image photography apparatus 100. If the receiver 120 is a program executable by the controller 130, then the controller 130 may detect whether the event occurs. For example, the controller 130 may detect whether a power source is re-applied to the image photography apparatus 100. Alternatively, the receiver 120 may include hardware to detect occurrence of the event to recover the image, and may transmit commands to the controller 130 to perform retrieval of the image.

The controller 130 performs overall control operations with respect to elements 110 through 160 of the image photography apparatus 100.

If the user command is input, the controller 130 determines whether the image that is the subject of an aborted edit operation is to be recovered to the unedited original image or whether editing of the image is to be resumed to recover the image to the completely edited image, according to the edited degree of the image. The controller 130 may also recover the unedited original image or the completely edited image.

Recovery of the image refers to a return to a state before editing was halted. The recovery may also include all processing operations for changing an image that has stopped editing to an original image or a completely edited image.

The display unit 140 displays an image. The display unit 140 may include a touch-screen, a monitor, or any other type of display. The display unit 140 may display a screen or a graphical user-interface to prompt a user to select one of the unedited original image or the completely edited image.

The photographing unit 150 converts an optical image incident through a lens into an electric signal, removes noise from the electric signal, and adjusts a gain of the electric signal in order to convert the electric signal into a digital signal.

The image processor 160 performs various image processing operations with respect to the digital signal and provides the processed digital signal to the display unit 140.

The image processor 160 performs various image processing operations such as a quality improvement, a resolution transformation, and the like. The image processor 160 recovers the image that has been partially edited to the unedited original image or resumes editing of the image to recover the image to the completely edited image.

The image photography apparatus 100 may further include an audio signal receiver (not shown), an audio signal processor (not shown), a communication interface unit (not shown), a power supply unit (not shown), etc. The audio signal receiver receives an audio signal, and the audio signal processor performs various processing operations with respect to the audio signal. The communication interface unit performs various communications through a network or a universal serial bus (USB) device, and the power supply unit supplies a power source.

The image photography apparatus 100 may include a camcorder, a digital camera, a smart-phone, etc.

According to an exemplary embodiment, the image photography apparatus 100 may include the storage unit 110 which stores data generated in the image photography apparatus 100 during editing, the receiver 120 which, if editing of an image that is being edited in the image photography apparatus 100 stops, receives an event to recover the image, and the controller 130 which determines whether the image is to be recovered to an unedited original image or editing of the image is to be resumed to recover the image to a completely edited image, according to an edited degree of the image, in order to recover the image to the unedited original image or the completely edited image.

Accordingly, the image photography apparatus 100 may recover an image that has been the subject of an aborted editing operation to an unedited original image or resume editing of the image to recover the image to a completely edited image, thereby promoting the convenience of a user.

Figure 2:
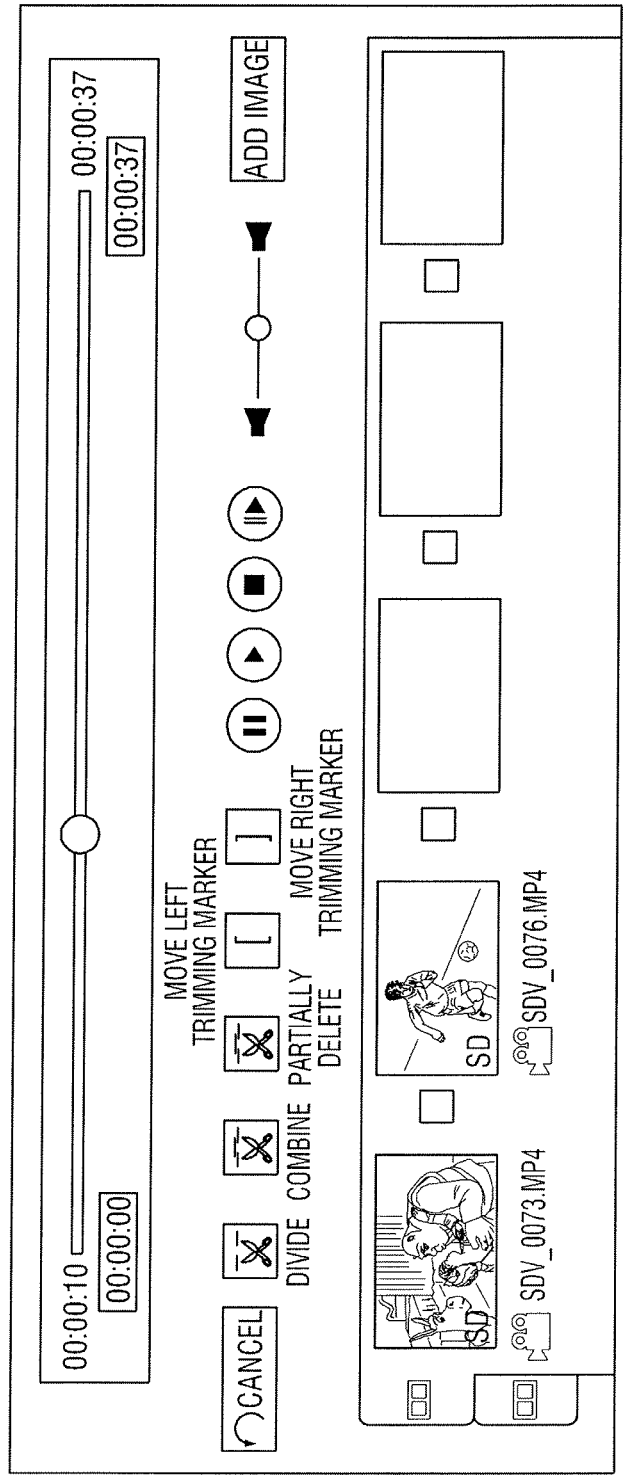
FIG. 2 is a view illustrating an image editing screen which is displayed on a display unit, according to an exemplary embodiment.

FIG. 2 is a view illustrating an image editing screen which is displayed on a display unit, according to an exemplary embodiment.

Referring to FIG. 2, an image is selected using a scroll bar to be edited. For example, if a whole play time of a specific image is 37 seconds, a portion of the image only between 10 seconds and 30 seconds may be selected and edited.

Also, icons such as a division, a combination, a partial deletion, and the like may be selected to edit the image.

For example, in order to perform a division of editing of the image, a part of a whole image play time is selected to divide an image file into 2 or more image files.

As another example, in order to perform a combination of editing of the image, an order of an image which will be first played and an image which will be played later may be determined according to an order of the selected images, and the images may be combined based on the determined order.

As another example, in order to perform a partial deletion of editing of the image, only an image in a specific time period of a whole play time may be selected, and the selected image may be deleted.

The image editing screen may be realized in a touch screen form and thus may perform an operation of the receiver 120 which receives the user command.

Figure 3:
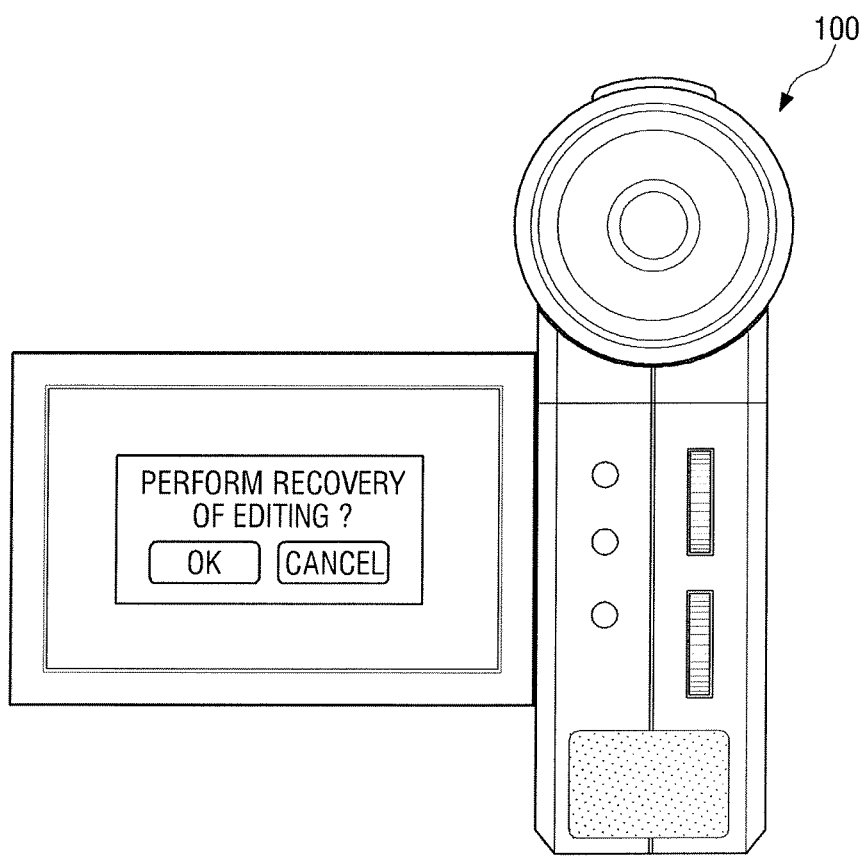
FIG. 3 is a view illustrating a window which is displayed on a display unit to receive a user command, according to an exemplary embodiment.

FIG. 3 is a view illustrating a window which is displayed on a display unit to receive a user command, according to an exemplary embodiment.

Although a problem such as a removal of a memory or a removal of power occurs when the image photography apparatus 100 performs image editing, the image photography apparatus 100 may store temporary data, recovery reference data, etc. which are generated in each step of a process of editing an image.

Therefore, if the image photography apparatus 100 is restarted (or rebooted) by solving the problem, the image photography apparatus 100 may display a window as shown in FIG. 3.

If a user selects a button to perform an editing recovery, the image photography apparatus 100 may determine whether an image that has stopped editing is to be recovered to an unedited original image or editing of the image is to be resumed to recover the image to a completely edited image and may recover the image to the unedited original image or the completely edited image according to the determination.

The window to receive the user command may be realized in the touch screen and thus may perform the operation of the receiver 120. In other words, the receiver 120 may include a touch screen or may be connected to the touch screen to receive commands from a user.

If the window of FIG. 3 to receive the user command is not displayed, and an event to re-apply a power source to the image photography apparatus 100 is received, the image photography apparatus 100 may automatically determine whether an image that has been the subject of an aborted editing operation is to be recovered to an original image or a completely edited image, according to an edited degree of the image.

Figure 4:
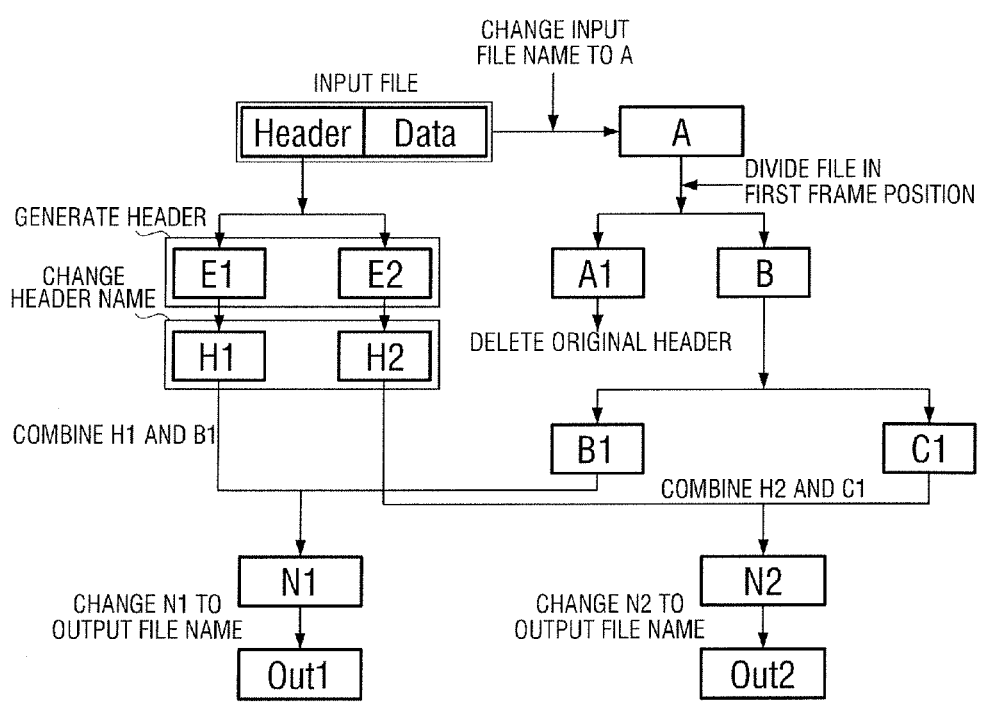
FIGS. 4 and 5 are flowcharts illustrating a division operation of image editing which is performed by an image photography apparatus, according to an exemplary embodiment.
Figure 5:
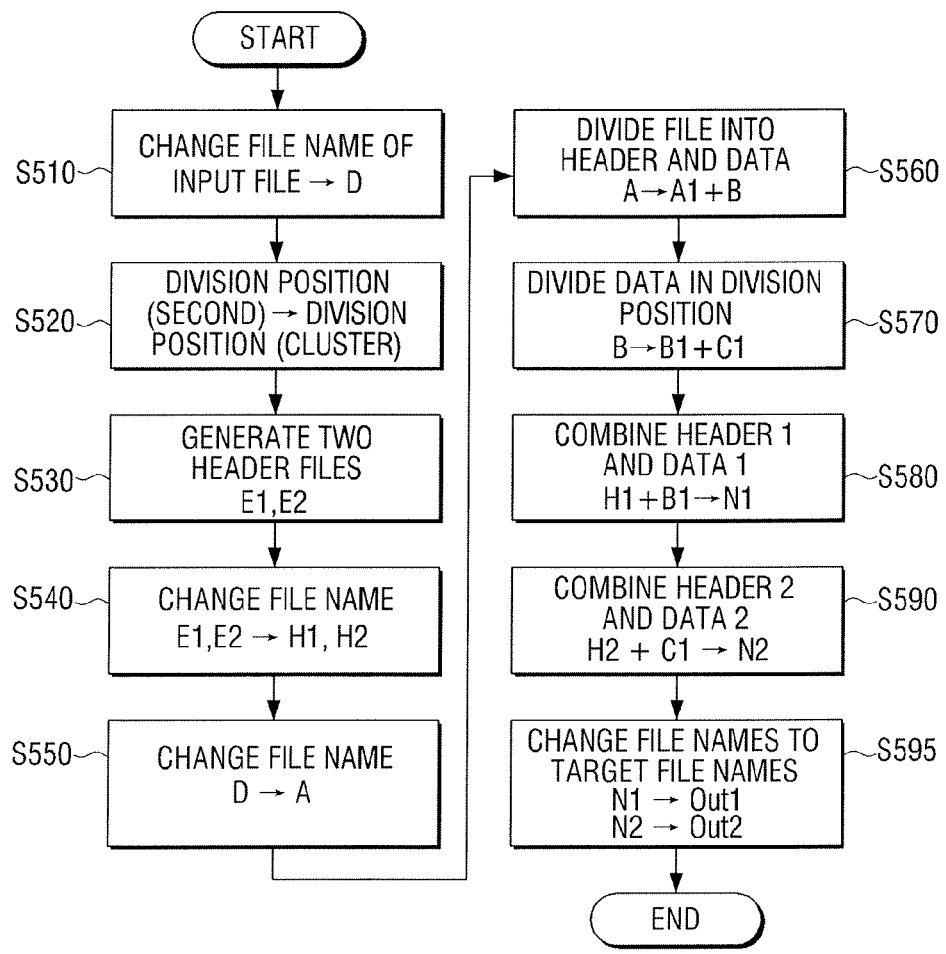

FIGS. 4 and 5 are flowcharts illustrating a division operation of image editing which is performed by an image photography apparatus, according to an exemplary embodiment.

Referring to FIGS. 4 and 5, an image (i.e., an input file) which is stored in the image photography apparatus 100 is divided into two files according to a time period. The input file has a header area, a data area, a file name, and an extension. The header area stores whole play time information of the image, information about a position of data which will be played at a corresponding time in the data area, and the like. The data area stores various types of information such as pixel values of a captured image and the like.

In operation S510, the image photography apparatus 100 changes a file (i.e., the input image) including the header area and the data area to a first file. Since a storage space of the storage unit 110 of the image photography apparatus 100 is limited, the input file is not stored as a separate file from the edited or first file, but is changed to the first file when the image is edited.

For example, if the input file has a file name X.mp4, the image photography apparatus 100 may change the file name X.mp4 of the input file to a file name D.idx. The image photography apparatus 100 may change the extension to identify that the image is being edited, concurrently with changing the file name.

The image photography apparatus 100 determines in operation S520 a division position of the header area based on an image editing command and a division position of data which is received by the receiver 120. If a user selects a specific time of a whole play time of the image on an image editing screen, the image photography apparatus 100 determines the division position (a cluster) based on the selected specific time.

The image photography apparatus 100 divides the header area of the input file into a plurality of headers according to the determined division position and respectively generates in operation S530 a plurality of headers using the determined division position. In operation S540, the image photography apparatus 100 changes file names of the plurality of generated headers, respectively. The plurality of generated headers and the plurality of headers having the changed file names are stored in the storage unit 110.

For example, the image photography apparatus 100 may divide the header of the input file into two headers and generate headers E1.idx and E2.idx, respectively, using the two input file headers. The image photography apparatus 100 may change the headers E1.idx and E2.idx to headers H1.idx and H2.idx, respectively. The image photography apparatus 100 changes file names of the headers E1.idx and E2.idx to the headers H1.idx and H2.idx, respectively, to indicate that the input file header has been divided.

The image photography apparatus 100 changes the first file to a second file in operation S550. The image photography apparatus 100 stores the second file in the storage unit 110.

For example, the image photography apparatus 100 may change a first file D.idx to a second file A.idx. The second file may be recovery reference data. In other words, detection of the second file A.idx may constitute detection of recovery reference data, while detection of only the first file D.idx may not.

The image photography apparatus 100 divides data stored as the second file into a header and data. In this case, the image photography apparatus 100 divides the data into the header and the data using an intelligent data reduction (IDR) frame in operation S560. For example, the image photography apparatus 100 may divide a second file A into a header A1 and data B.

In operation S570, the image photography apparatus 100 divides the data into a plurality of pieces of data based on the division position. For example, the image photography apparatus 100 may divide the data B into data B1 and data C1.

In operations S580 and S590, the image photography apparatus 100 combines the plurality of generated headers with the plurality of pieces of data so that the plurality of generated headers respectively correspond to the plurality of pieces of data, to generate a plurality of files based on the division position. For example, the image photography apparatus 100 may combine the header H1 with the data B1 to generate a file N1 and may combine the header H2 with the data C1 to generate a file N2.

The image photography apparatus 100 may respectively change file names of the plurality of files in operation S595 to indicate files that are not in the process of being edited. The image photography apparatus 100 respectively stores the files having the changed file names. Therefore, the image photography apparatus 100 completes the division operation of the image editing. For example, the image photography apparatus 100 may change the file N1 to an output file Out1 and the file N2 to an output file Out2.

The input file may be an original file, and the output files Out1 and Out2 may be completely edited images.

Operations S510 through S540 may be operations of dividing the header of the input file, operations S550 through S570 may be operations of dividing the data of the input file, and operations S580 through S595 may be operations of combining divided headers with data to generate final output files.

Two files, two header files, and extensions described with reference to FIGS. 4 and 5 are only examples and the present general inventive concept is not limited thereto.

Figure 6:
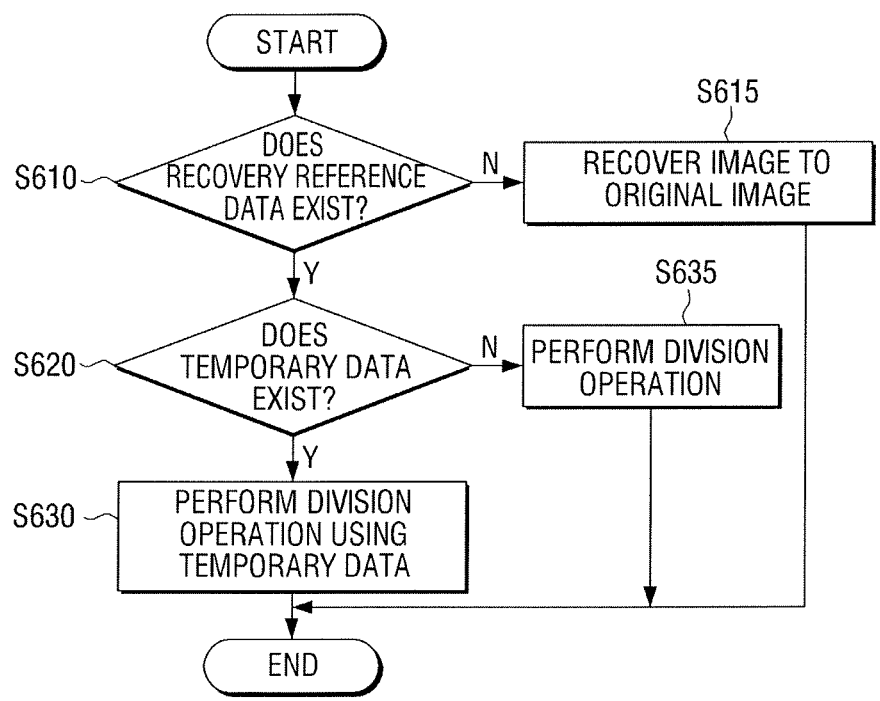
FIG. 6 is a flowchart illustrating a method of recovering an image on which a division operation of image editing is performed, according to an exemplary embodiment.

FIG. 6 is a flowchart illustrating a method of recovering an image on which a division operation of image editing is performed, according to an exemplary embodiment.

Referring to FIG. 6, the controller 130 determines in operation S610 whether recovery reference data exists. Step S610 may be a first determination step.

If it is determined in operation S610 that the recovery reference data does not exist, the image processor 160 recovers in operation S615 the image to an unedited original image under the control of the controller 130.

If it is determined in operation S610 that the recovery reference data exists, the controller 130 determines in operation S620 whether temporary data exists. Step S620 may be a second determination step.

If it is determined in operation S620 that the temporary data exists, a division operation is performed in operation S630 using the temporary data.

If it is determined in operation S620 that the temporary data does not exist, the division operation is performed in operation S635 without using the temporary data.

Referring to FIGS. 4 through 6, image editing (division) may be compulsorily ended when the image photography apparatus 100 performs the division operation, and then the image photography apparatus 100 may perform an editing image recovery.

In this case, the image photography apparatus 100 may determine whether an image that is the subject of an aborted editing operation is to be recovered to an original image or a completely edited image, based on the file generated in operation S550. In other words, the first file D.idx generated in step S510 may be a recovery reference file. Alternatively, the second file A.idx generated in step S550 may be a recovery reference file.

The image photography apparatus 100 may determine a recovery reference file based on whether a corresponding file name of a preset file is stored in the storage unit 110. If the second file is the recovery reference file, an extension of the second file may be changed differently from extensions of the files generated in steps S510 through S540 to distinguish the recovery reference file from temporary data.

As another example, the image photography apparatus 100 may determine whether the image that has stopped editing is to be recovered to an original image or a completely edited image, based on the file generated in step S560.

The header A1 or the data B of the file generated in step S560 may be a recovery reference file. In this case, since a file size of the header A1 or the data B is smaller than those of an input file, a first file, and a second file, a recovery reference file may be determined based on the file size of the header A1.

Figure 7:
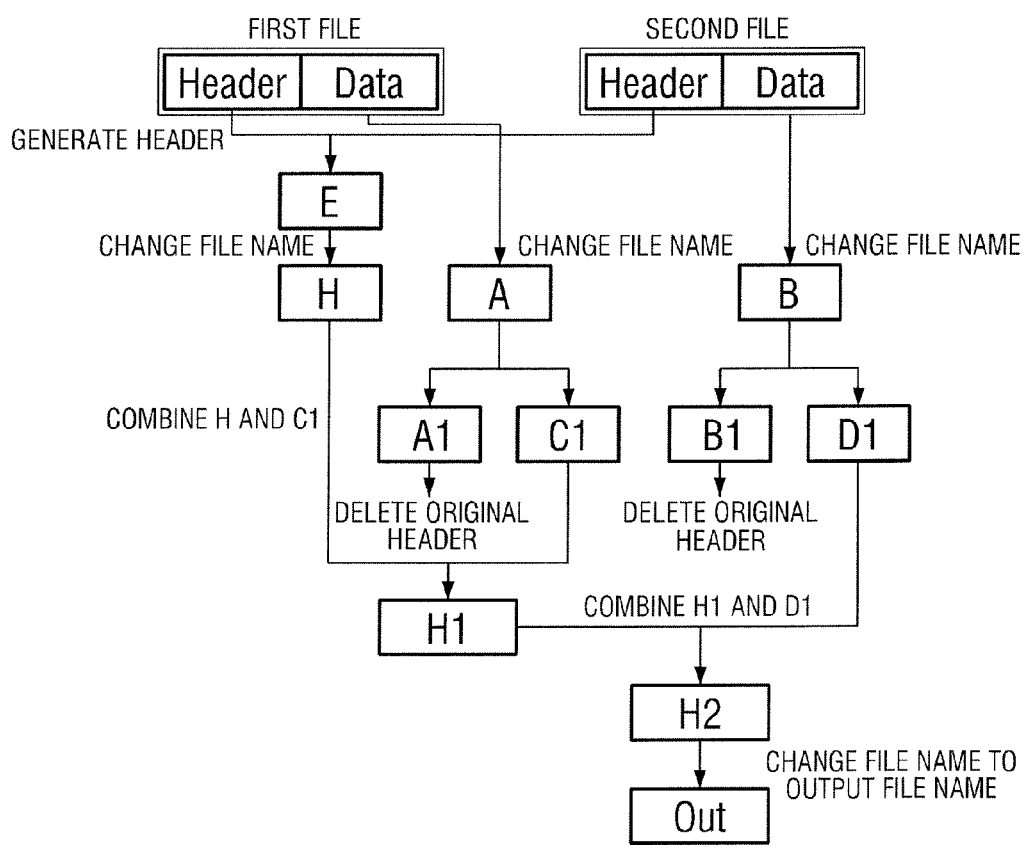
FIGS. 7 and 8 are flowcharts illustrating a combination operation of image editing which is performed by an image photography apparatus, according to an exemplary embodiment.
Figure 8:
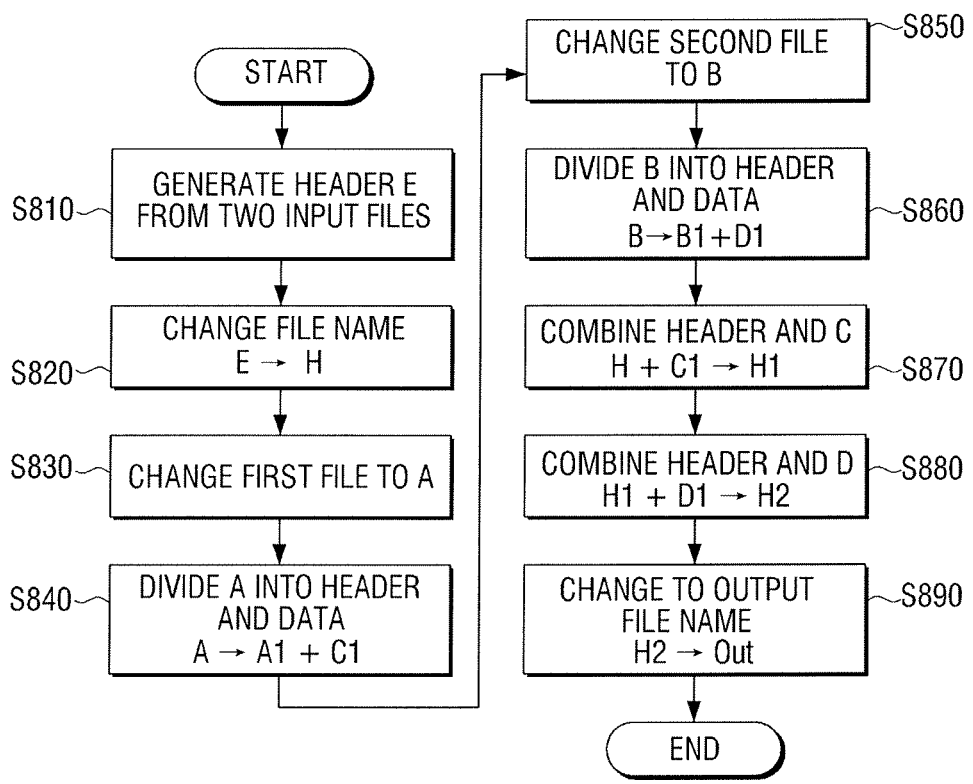

FIGS. 7 and 8 are flowcharts illustrating a combination operation of image editing which is performed by an image photography apparatus, according to an exemplary embodiment.

Referring to FIGS. 7 and 8, the image photography apparatus 100 includes first and second input files and combines the first and second input files to generate a file.

In operation S810, the image photography apparatus 100 generates a header E using a header of the first input file and a header of the second input file. In this case, contents of the header E may vary depending on whether the first input file is first played and then the second input file is played or the second input file is first played and then the first input file is played.

In operation S820, the image photography apparatus 100 changes the header E to a header H. Thus, the image photography apparatus 100 identifies that the headers have been combined.

In operation S830, the image photography apparatus 100 changes at least one of the first input file name and file type. The first input file may be changed to a file having a file name A.idx, and the file name A.idx may be stored in the storage unit 110. However, since the storage space of the storage unit 110 of the image photography apparatus 100 is limited, the first input file may not be separately stored, but the input file itself may be changed in operation S830.

In operation S840, the image photography apparatus 100 divides the file having the file name A.idx into a header A1 and data C1. The file having the file name A.idx may changed in operation S830 may be considered recovery reference data. Alternatively, the header A1 and the data C1 divided in step S840 may be considered recovery reference data.

The image photography apparatus 100 repeats steps S830 and S840 with respect to the second input file.

The image photography apparatus 100 changes the second input file in operation S850. Thus, a file name of the second input file may be changed to B.idx, and the changed file name B.idx may be stored in storage unit 110. Since the storage space of the storage unit 110 of the image photography apparatus 100 is limited, the second input file may not be separately stored, but the second input file itself may be changed.

The image photography apparatus 100 divides the file having the file name B.idx into a header B1 and data D1 in operation S860. In this case, the file having the file name B.idx changed in step S850 may be considered recovery reference data. Alternatively, the header B1 and the data D1 divided in step S860 may be considered recovery reference data.

In operation S870, the image photography apparatus 100 combines the header H with the data C1 to generate a file H1. In operation S880, the image photography apparatus 100 combines the file H1 with data D1 to generate a file H2.

The image photography apparatus 100 changes the file H2 to an output file Out in operation S890.

The image photography apparatus 100 may further change the file names of the first and second input files before step S810.

The first and second input files may be respectively original images, and the output file Out may be a completely edited image.

Operations S810 and 820 may be operations of combining headers, operations S830 and S840 may be operations of dividing a first input file into a header and data, operations S850 and 860 may be operations of dividing a second input file into a header and data, and operations S870 through S890 may be operations of combining a header and data to generate a final output file.

The method of recovering an image on which the combination operation of image editing is performed is similar the method described with reference to FIG. 6. For example, in a combination operation, the "original image" of operation S615 may include the first and second image files of FIG. 7, and operations S635 and S630 may include performing combination operations instead of division operations.

Figure 9:
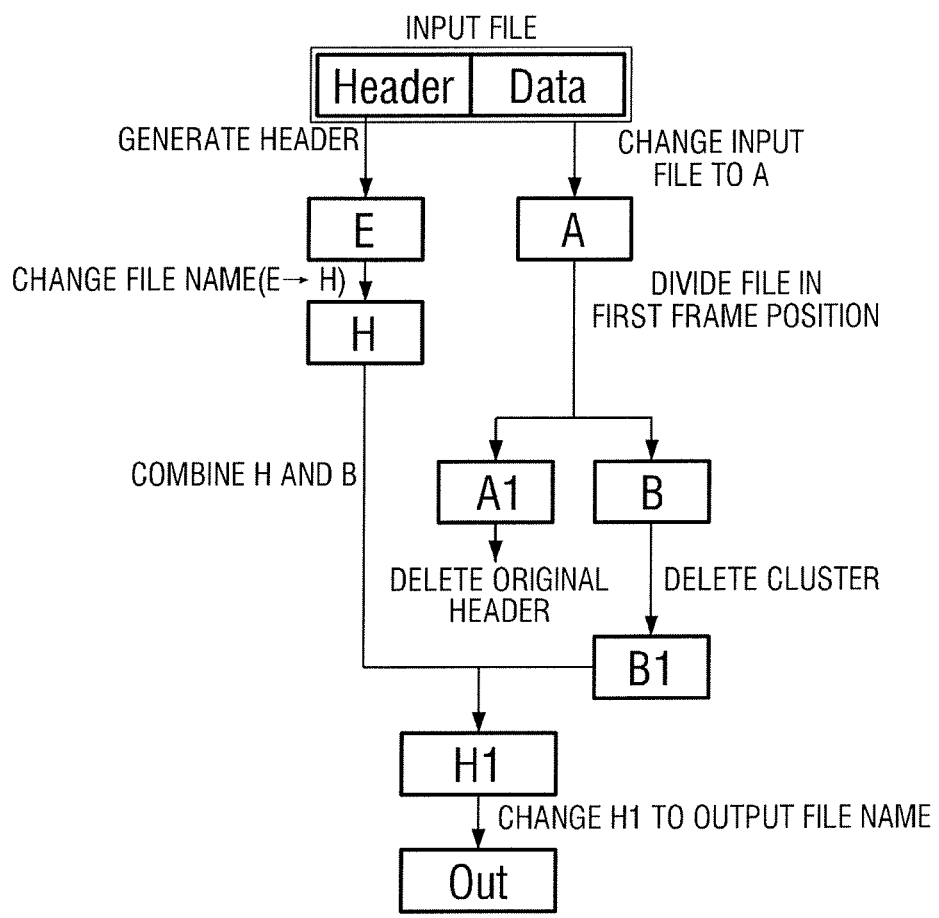
FIGS. 9 and 10 are flowcharts illustrating a deletion operation of image editing which is performed by an image photography apparatus, according to an exemplary embodiment.
Figure 10:
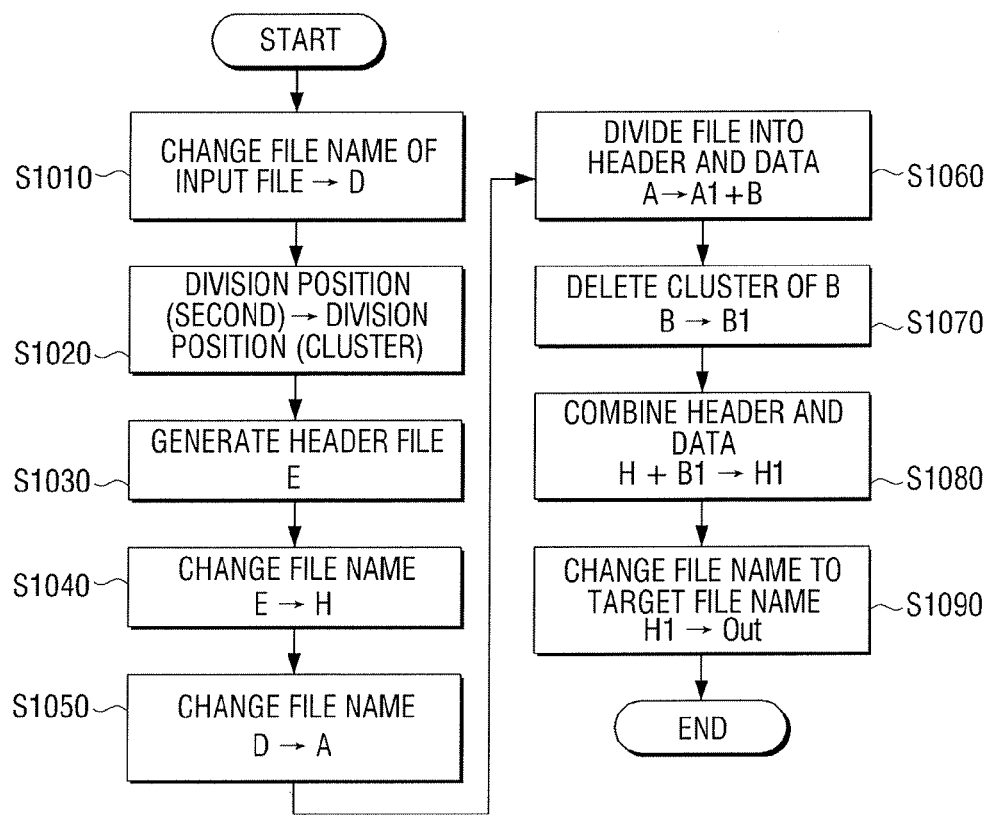

FIGS. 9 and 10 are flowcharts illustrating a partial deletion operation of image editing which is performed by an image photography apparatus, according to an exemplary embodiment.

Referring to FIGS. 9 and 10, the image photography apparatus 100 includes an input file and deletes a partial period of a whole time period of the input file to edit the input file.

The image photography apparatus 100 changes a file name of the input file in operation S1010. For example, the file name of the input file may be changed to D.idx. Since the storage space of the storage unit 110 of the image photography apparatus 100 is limited, the input file may not be separately stored, but may be changed during image editing.

In operation S1020, the image photography apparatus 100 determines a partial deletion position of a header based on an image editing command and a data division position received by the receiver 120. If a user selects a specific time period of a whole play time period of an image on an image editing screen, the image photography apparatus 100 determines the partial deletion position (a cluster) based on the selected time period.

In operation S1030, the image photography apparatus 100 generates a header E in consideration of an image, a part of which will be deleted. Thus, contents of a header of the input file are changed.

In operation S1040, the image photography apparatus 100 changes the header E to a header H.

In operation S1050, the image photography apparatus 100 changes the file D changed in step S1010 to a file A.

The file A having a file name A.idx changed in step S1050 may be considered recovery reference data. A header A1 and data B into which the file A will be divided in step S1060 may alternatively be considered recovery reference data.

The image photography apparatus 100 divides the file A into the header A1 and the data B in operation S1060.

The image photography apparatus 100 deletes a cluster of the data B based on the selected time period in operation S1070.

The image photography apparatus 100 combines the header H with data B1 to generate a file H1 in operation S1080.

The image photography apparatus 100 changes the file H1 to an output file Out in operation S1090.

Accordingly, the image photography apparatus 100 edits the input file to an image of which partial time period of a whole time period has been deleted.

A method of recovering an image on which the partial deletion operation of image editing is performed is similar to the method of FIG. 6 but is different from the method of FIG. 6 in that if the image does not include the temporary data, the partial deletion operation may be performed in operation S635 without using the temporary data, and if the image includes the temporary data, the partial deletion operation may be performed in operation S630 using the temporary data.

Figure 11:
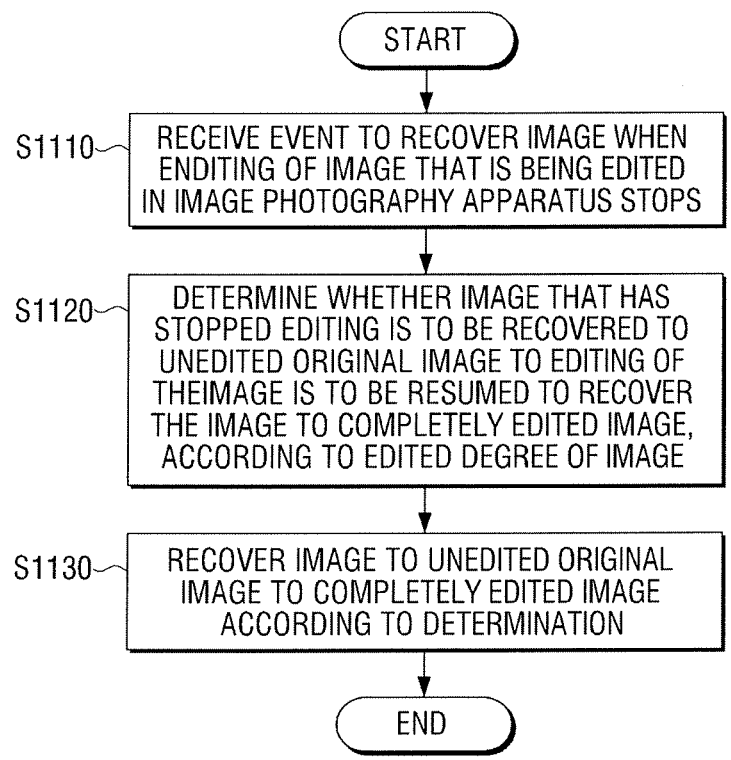
FIG. 11 is a flowchart illustrating a method of recovering an image of an image photography apparatus according to an exemplary embodiment.

FIG. 11 is a flowchart illustrating a method of recovering an editing image of an image photography apparatus according to an exemplary embodiment.

Referring to FIG. 11, when editing of an image stops in the image photography apparatus 100, the image photography apparatus 100 receives an event to recover the image in operation S1110. Or in other words, the event occurs, and the image photography apparatus 100 receives a notice or other instruction indicating that the event has occurred.

In operation S1120, the image photography apparatus 100 determines whether the image is to be recovered to an unedited original image or editing of the image is to be resumed to recover the image to a completely edited image, according to an edited degree of the image.

In operation S1130, the image photography apparatus 100 recovers the image to the unedited original image or the completely edited image according to the determination.

Accordingly, an image that is the subject of an aborted editing operation may be recovered to an original image or a completely edited image according to an edited degree of the image, thereby promoting the convenience of a user.

The determination step may include a first determination step to determine whether recovery reference data is generated during editing and a second determination step to determine whether temporary data is generated during editing.

If it is determined that the recovery reference data is not generated, the determination step may determine to recover the image that has stopped editing to the original image.

If it is determined that the temporary data is generated, the determination step may further include determining to recover the image that has stopped editing to the completely edited image using the stored temporary data.

If an event is received, the determination step may further include automatically determining whether the image is to be recovered to the original image or the completely edited image, according to an edited degree of the image.

The method of recovering the editing image of the image photography apparatus may further include receiving an image editing command and editing the image according to the image editing command. In this case, the editing of the image may include storing data which is generated when the image is edited.

Figure 12A:
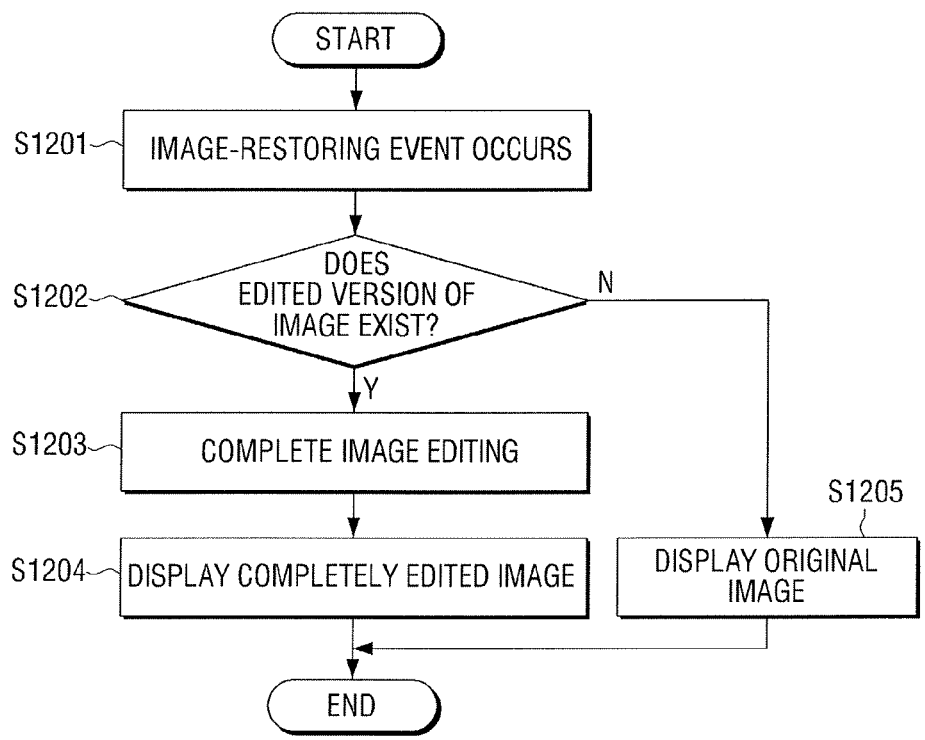
FIGS. 12A and 12B illustrate methods of recovering an image according to embodiments of the present general inventive concept.

FIG. 12A illustrates a method of recovering an image according to another embodiment of the present general inventive concept. In operation S1201, an image-restoring event occurs. The event may include a user input to initiate an image-restoration operation, a return of power to an image-editing device, a return of a memory device to the image-editing device, or any other event.

When the event is detected, it may be determined in operation S1202 whether an edited version of the image exists. For example, if a command was given to edit an image before a power-loss occurred and before the image was actually edited, then no edited version of the image may exist. In addition, if a user only indicated a desire to edit an image without actually editing the image, such as by entering an editing user interface and selecting the image, but without actually editing the image, then no edited version may exist. Accordingly, the original version of the image may be displayed or stored in operation S1205.

However, if an edited version is detected in operation S1202, then the editing process may be automatically completed in operation S1203. For example, if a division operation was initiated but power was lost before completion, then the division operation may be completed in operation S1203, and one or more of the divided images may be displayed or stored in operation S1204.

Figure 12B:
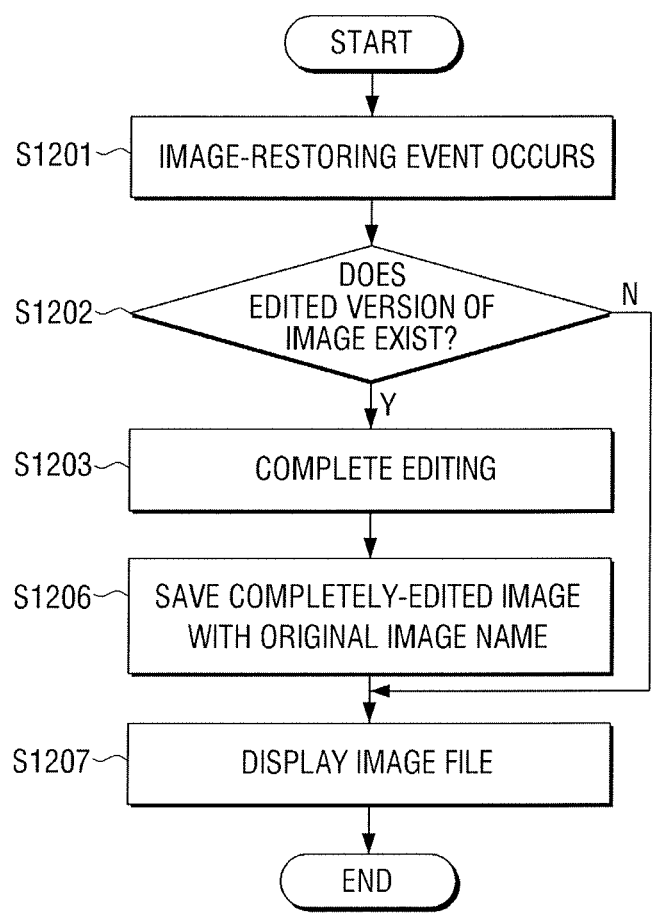

FIG. 12B is similar to FIG. 12A, except the edited image is stored to have the same file name as the original image in operation S1206. When a division operation is performed, then one of the divided images is saved to have the original file name, and that image may be displayed or stored in operation S1207. In contrast, in FIG. 12A, the completely edited image in the method illustrated in FIG. 12A may have a file name different from the original image.

Figure 13:
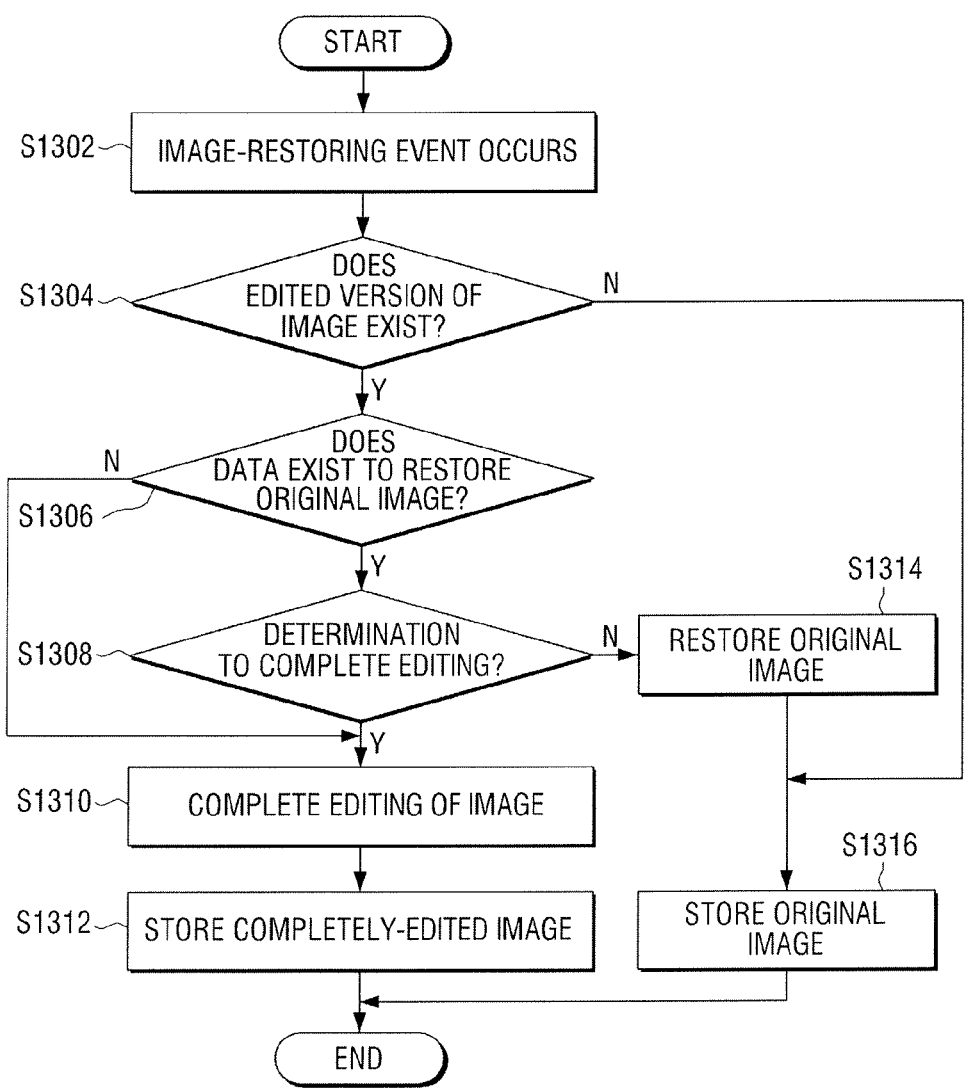
FIG. 13 illustrates a method of recovering an image according to another embodiment of the present general inventive concept.

FIG. 13 illustrates a method of recovering an image according to yet another embodiment of the present general inventive concept. In operation S1302, the image-restoring event occurs, as discussed above. In operation S1304, it may be determined whether an edited version of the image exists. The edited version is a partially-edited version, or a version of the image that has begun an editing process but has not yet completed the editing process. For example, an edited image file may have a file type that is different than an original or completely edited image.

If it is determined that no edited version exists, the original version of the image may be stored and/or output to a display or other device in operation S1316. Otherwise, it may be determined in operation S1308 whether data exists to restore the original image. If it is determined that such data to restore the original image does not exist, the editing of the image may be automatically completed in operation S1310. On the other hand, if it is determined that data exists to store the original image, then it may be determined in operation S1308 whether the editing should be automatically completed, or whether the original image should be restored.

For example, if an editing operation is begun to divide a video image into multiple videos, and the editing process is begun by generating multiple headers and data sections, but the headers and data sections are not yet combined to form multiple completed video files, then it may be determined that the original data still exists to restore the original video image. Accordingly, a user prompt may be generated to request whether a user wants to divide the video or restore the non-divided video. Alternatively, the determination whether to complete the editing of operation S1308 may be made according to predetermined conditions, such as a file size, a stage of an editing process (e.g. whether temporary data has been generated or whether the content of the original image has been modified), or any other predetermined condition.

If it is determined in operation S1308 that the editing process should not be completed, then the original image may be restored in operation S1314 using the edited image. On the other hand, if it is determined in operation S1308 that the editing process should be completed, then the image may be completely edited in operation S1310, and the completely edited image may be stored and/or output to a display or other device in operation S1312. Accordingly, a user or predetermined conditions may be used to determine whether to restore an image to an original image or to complete an editing operation of the image.

Figure 14:
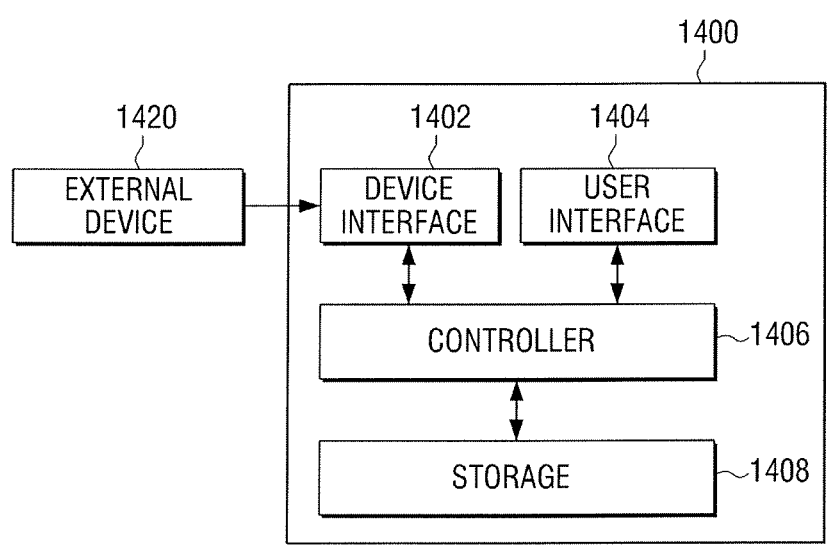
FIG. 14 illustrates an image-editing device according to an embodiment of the present general inventive concept.

FIG. 14 illustrates an image-editing device according to an embodiment of the present general inventive concept. The image-editing device 1400 may include a device interface 1402, a user interface 1404, a controller 1406, and a data storage unit 1408. The user interface 1404 may include a keyboard, keypad, touch screen, a monitor or other display, or any other device to allow a user to interface with the image-editing device 1400. While the device of FIG. 14 is described as an image-editing device, any device that is capable of editing an image, including the photography apparatus 100 of FIG. 1, may be considered an image-editing device.

The device interface 1402 may include one or more data ports such as hardware ports or antenna to connect to devices 1420 external to the image-editing device 1400. The external devices 1420 may include cameras, camcorders, other imaging devices, memory devices that store image files, or any other external device.

The data storage unit 1408 stores one or more image files, and the controller 1406 controls the image-restoration operation of the image-editing device 1400. For example, if a user is editing an image stored in the storage unit 1408 via the user interface 1404, and power is lost and then restored to the image-editing device 1400, then the controller 1406 may perform operations described in any one of FIGS. 4-13 to restore the original image or complete an editing operation of an edited image. The controller 1406 may include an image processor, or an image processor may be a separate device, as illustrated in FIG. 1. The image-editing device 1400 may include a photographing unit, as illustrated in FIG. 1, or the photographing unit may be part of an external device 1420 that may be connected to the image-editing device 1400.

According to the present general inventive concept, when an editing process is interrupted or aborted before the editing process is completed, an image-editing device, image photography apparatus, or other device on which the edited image is stored and edited, may complete the editing process at a later time. The editing process may be aborted due to loss of power or loss of memory, so that the image-editing device or photography apparatus does not have the ability to complete the editing process before shutting down or turning off. The editing process may resume when power is restored, when memory is re-connected, or according to a user command, for example.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A method of recovering an editing image of an image photography apparatus, the method comprising:
    detecting an event to recover the image that has been the subject of an editing process that has been stopped in an image photography apparatus, such that the detected event includes at least one of an event in which memory that has been removed from the image photography apparatus is re-attached to the image photography apparatus and a power source is re-applied to the image photography apparatus;
    determining, in response to receiving the detected event, whether the image is to be recovered to an unedited original image and whether editing of the image is to be resumed at a point where the editing process stopped to complete the editing process in order to recover the image to a completely edited image, according to an edited degree of the image; and
    recovering the image to the unedited original image or the completely edited image according to the determination.

2. The method as claimed in claim 1, wherein the determination comprises: a first determination to determine whether recovery reference data is generated during editing of the image; and, if it is determined that the recovery reference data is generated during editing of the image, a second determination to determine whether temporary data is generated during editing of the image.

3. The method as claimed in claim 2, wherein the determination further comprises: if it is determined that the recovery reference data is not generated during editing of the image, determining to recover the image to the unedited original image.

4. The method as claimed in claim 2, wherein the determination further comprises: if it is determined that the temporary data is generated during editing of the image, determining to recover the image to the completely edited image using the stored temporary data.

5. The method as claimed in claim 1, further comprising: receiving an image editing command to edit the image; and editing the image according to the image editing command.

6. The method as claimed in claim 5, wherein the edition of the image comprises storing data which is generated during editing of the image.

7. The method as claimed in claim 1, wherein the determination is to automatically determine whether the image is to be recovered to the unedited original image or the completely edited image according to the edited degree of the image if the event is received.

8. The method as claimed in claim 1, wherein the event is further includes a user command to request a recovery of the image.

9. An image photography apparatus comprising:
   a storage unit to store data which is generated when an image is edited in the image photography apparatus;
   a receiver to receive an event to recover the image if editing of the image that is being edited in the image photography apparatus stops, such that the received event includes at least one of an event in which memory that has been removed from the image photography apparatus is re-attached to the image photography apparatus and a power source is re-applied to the image photography apparatus; and
   a controller, in response to receiving the received event, to determine whether the image is to be recovered to an unedited original image and whether editing of the image is to be resumed at a point where the editing stopped to complete the editing in order to recover the image to a completely edited image according to an edited degree of the image so as to recover the image to the unedited original image or the completely edited image.

10. The image photography apparatus as claimed in claim 9, wherein the controller determines whether data generated during editing of the image comprises recovery reference data.

11. The image photography apparatus as claimed in claim 10, wherein if it is determined that the data comprises the recovery reference data, the controller determines whether temporary data is stored during editing of the image.

12. The image photography apparatus as claimed in claim 10, wherein if it is determined that the data does not comprise the recovery reference data, the controller recovers the image to the unedited original image.

13. The image photography apparatus as claimed in claim 11, wherein if it is determined that the temporary data is stored during editing of the image, the controller recovers the image to the completely edited image using the temporary data.

14. The image photography apparatus as claimed in claim 9, wherein the receiver receives an image editing command to edit the image, and the controller edits the image according to the image editing command.

15. The image photography apparatus as claimed in claim 9, wherein if the event is received, the controller automatically determines whether the image is to be recovered to the unedited original image or the completely edited image according to the edited degree of the image.

16. The image photography apparatus as claimed in claim 9, wherein the event further includes a user command to request a recovery of the image.

17. The image photography apparatus as claimed in claim 9, wherein the image photography apparatus is a camcorder.

18. A method of recovering an image file, the method comprising:
   receiving a command with respect to an image file;
   determining whether an editing version of the image file exists; and
   determining, in response to receiving an edit-process ending event, whether to respond to the command using one of an original version of the image file and the editing version of the image file according to a level of editing of the edited version of the image such that the editing of the editing version of the image file is resumed at a point where the editing stopped to complete the editing of the editing version of the image file, such that the edit-process-ending event is one of a loss-of-power, a program crash, and a disconnection of a memory device in which the editing version of the image file is stored.

19. The method according to claim 18, further comprising, before receiving the request to output the image, storing the editing version of the image file as a result of the edit-process-ending event.

20. The method according to claim 18, wherein receiving the command corresponds to a selection by a user.

21. The method according to claim 18, wherein receiving the command corresponds to turning on a display device after one of a program crash and a loss-of-power of the display device or re-connecting memory having stored therein the editing version of the image file to the display device.

22. The method according to claim 18, wherein determining whether the editing version of the image file exists includes determining whether at least one of recovery reference data and temporary data exists, and
   wherein the recovery reference data is data generated at a beginning of an editing operation of the image, and
   the temporary data is data generated based on the recovery reference data to perform the editing of the image file.

23. The method according to claim 22, wherein determining which of the original version and the editing version of the image file to use to respond to the command includes, when it is determined that both recovery reference data and temporary data exist, performing an editing operation using the temporary data, and
   when it is determined that only the recovery reference data exists from among the recovery reference data and the temporary data, performing the editing operation of the image by generating temporary data based on the recovery reference data.

24. The method according to claim 22, wherein determining which of the image and the edited version of the image to output includes determining whether at least one of the recovery reference data and the temporary data exists, and outputting the original version of the image file if neither of the recovery reference data and temporary data exists.

25. An image-editing device, comprising:
   a storage unit to store at least one of an original version of an image file and an editing version of the image file to be used to edit the original version of the image file; and
   a controller to receive a command with respect to the original version of the image file, to determine whether the editing version of the image file exists, and to determine, in response to receiving an edit-process-ending event, which of the original version and the editing version of the image file to use to respond to the command according to a level of editing of the editing image file such that the editing of the editing version of the image file is resumed at a point where the editing stopped to complete the editing of the editing version of the image file, such that the edit-process-ending event includes at least one of a loss-of-power to the image-editing device and a program crash of a program executed by the controller.

26. The image-editing device according to claim 25, further comprising a user interface to receive the command from a user.

27. The image-editing device according to claim 25, wherein the controller stores the editing version of the image file in the storage unit when the edit-process-ending event occurs.

28. The image-editing device according to claim 25, wherein the controller determines whether the editing version of the image file exists by determining whether at least one of recovery reference data and temporary data exists in the storage unit,
the recovery reference data is data generated at a beginning of an editing operation of the image, and
the temporary data is data generated based on the recovery reference data to perform the editing of the image.

29. The image-editing device according to claim 28, wherein when the controller determines that both recovery reference data and temporary data exist in the storage unit, the controller performs an editing operation using the temporary data, and
when the controller determines that only the recovery reference data exists from among the recovery reference data and the temporary data, the controller performs the editing operation of the image by generating temporary data based on the recovery reference data.

30. The image-editing device according to claim 25, wherein the controller determines which of the original version of the image file and the editing version of the image file to use to respond to the command by determining whether at least one of the recovery reference data and the temporary data exists in the storage unit, and the controller responds to the command using the original version of the image file if neither of the recovery reference data and temporary data exists in the storage unit.

31. The image-editing device according to claim 25, further comprising an image processor to edit the image,
wherein the controller receives a command to edit the image and controls the image processor to retrieve the image and to generate the editing version of the image file.

32. A method of recovering an image file within an image photography apparatus, the method comprising:
receiving a command with respect to an original version of an image file;
determining whether an editing version of the image file exists; and
responding to the command with the editing version of the image file when the editing version of the image file exists such that editing of the editing version of the image file is resumed at a point where the editing stopped to complete the editing of the editing version of the image file, in response to a detected event, such that the detected event includes at least one of an event in which memory that has been removed from the image photography apparatus is re-attached to the image photography apparatus or a power source is re-applied to the image photography apparatus.

33. The method according to claim 32, further comprising:
after receiving the command, automatically completing an editing operation of the editing version of the image file when it is determined that the editing operation of the image has not yet been completed.

34. The method according to claim 33, further comprising, saving the completely edited version of the image file to have a same name as the original version of the image file to replace the original version.

* * * * *

UNITED STATES PATENT AND TRADEMARK OFFICE
CERTIFICATE OF CORRECTION

PATENT NO. : 8,982,241 B2  
APPLICATION NO. : 13/218071  
DATED : March 17, 2015  
INVENTOR(S) : Song-ha Choi It is certified that error appears in the above-identified patent and that said Letters Patent is hereby corrected as shown below:

In the Claims

Claim 8, column 15, line 21, after "event" delete "is".

Signed and Sealed this
Twenty-ninth Day of September, 2015

Michelle K. Lee  
*Director of the United States Patent and Trademark Office*